US010012835B2

(12) United States Patent
Masuda

(10) Patent No.: US 10,012,835 B2
(45) Date of Patent: Jul. 3, 2018

(54) IMAGE DISPLAY DEVICE

(71) Applicant: Sharp Kabushiki Kaisha, Sakai, Osaka (JP)

(72) Inventor: Junichi Masuda, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 5 days.

(21) Appl. No.: 15/508,148

(22) PCT Filed: Jul. 6, 2015

(86) PCT No.: PCT/JP2015/069424
§ 371 (c)(1),
(2) Date: Mar. 2, 2017

(87) PCT Pub. No.: WO2016/038999
PCT Pub. Date: Mar. 17, 2016

(65) Prior Publication Data
US 2017/0255009 A1 Sep. 7, 2017

(30) Foreign Application Priority Data
Sep. 8, 2014 (JP) .................................. 2014-182234

(51) Int. Cl.
*G02B 27/14* (2006.01)
*G02B 27/01* (2006.01)
*F21V 8/00* (2006.01)
*G02B 1/14* (2015.01)
*G02B 1/118* (2015.01)
*G02F 1/1335* (2006.01)

(52) U.S. Cl.
CPC .......... *G02B 27/0101* (2013.01); *G02B 1/118* (2013.01); *G02B 1/14* (2015.01); *G02B 6/0011* (2013.01); *G02F 1/133536* (2013.01)

(58) Field of Classification Search
CPC .................................................. G02B 27/0101
USPC .......................................................... 359/714
See application file for complete search history.

(56) References Cited

U.S. PATENT DOCUMENTS

2012/0300153 A1* 11/2012 Fujii ................. G02F 1/133308
349/58
2015/0296646 A1   10/2015 Hasegawa et al.

FOREIGN PATENT DOCUMENTS

JP       2004-325907 A    11/2004
JP       2007-148442 A     6/2007
(Continued)

OTHER PUBLICATIONS

Official Communication issued in International Patent Application No. PCT/JP2015/069424, dated Sep. 15, 2015.

*Primary Examiner* — James Jones
(74) *Attorney, Agent, or Firm* — Keating & Bennett, LLP

(57) ABSTRACT

Provided is an image display device with a see-through type display capable of inhibiting the reduction of the visibility of a background seen through a screen due to light emission from bright spots resulting from scratches and stains on a light guiding plate. In this image display device, a liquid crystal panel 30, a light guiding plate 45 with a light source 40 attached thereto, and a transparent plate 20 are disposed, from the display surface (front) side to the rear side, so as to be parallel to one another, and therefore, the surface of the light guiding plate 45 is inhibited from being scratched or stained by the transparent plate 20. Thus, the visibility of the image display device 100 is prevented from being reduced by bright spots.

8 Claims, 6 Drawing Sheets

(56) References Cited

FOREIGN PATENT DOCUMENTS

| JP | 2012-242805 A | 12/2012 |
| JP | 2014-091256 A | 5/2014 |
| WO | 2014/010585 A1 | 1/2014 |

\* cited by examiner

IMAGE DISPLAY DEVICE

TECHNICAL FIELD

The present invention relates to image display devices, particularly to an image display device including a see-through type display through which a background can be seen.

BACKGROUND ART

Recent years have seen active development of a display technology called a see-through display (transparent display) which not only displays an image on a screen but also allows an object behind the display to be viewed through the screen. To realize see-through displays, there have been proposed various approaches such as approaches using liquid crystal panels and organic EL (electroluminescent) panels.

For example, International Publication WO 2014/010585 describes a display including a translucent light guiding plate (self-luminous means) as well as a transparent display and a transparent plate, which are disposed opposite the light guiding plate on the front side. Light emitted by the light guiding plate is transmitted through the transparent display to the eye of the user. Accordingly, even if natural light is insufficient, the visibility of displayed content does not decrease.

Moreover, Japanese Laid-Open Patent Publication No. 2007-148442 describes a display including a translucent light guiding plate (self-luminous means), a transparent display, absorptive polarizing plates, and a reflective polarizer, in which the transparent display and the absorptive polarizing plates are disposed opposite the light guiding plate on the front side, and the reflective polarizer is disposed opposite the light guiding plate on the back side. Light emitted by the light guiding plate is either directly transmitted through the transparent display, or reflected by the reflective polarizer before the transmission through the transparent display, and reaches the eye of the user. This enhances light usage efficiency and thereby enhances the visibility of displayed content.

CITATION LIST

Patent Documents

Patent Document 1: International Publication WO 2014/010585
Patent Document 2: Japanese Laid-Open Patent Publication No. 2007-148442

SUMMARY OF THE INVENTION

Problems to be Solved by the Invention

However, in the case of the display described in International Publication WO 2014/010585, the light guiding plate is exposed to the outside and therefore is susceptible to scratches and stains, and such scratched or stained portions might emit light as bright spots. Such bright spots cause a problem of reduced visibility.

In this regard, in the case of the display described in Japanese Laid-Open Patent Publication No. 2007-148442, the light guiding plate is not exposed to the outside, so that no bright spots as described above occur, but the reflective polarizer is indispensable, resulting in an increase in device production cost.

Therefore, an objective of the present invention is to provide an image display device including a see-through type display capable of inhibiting the reduction of the visibility of a background seen through a screen due to bright spots resulting from scratches and stains on a light guiding plate.

Means for Solving the Problems

A first aspect of the present invention is directed to an image display device with a display capable of providing transparent display to allow a background to be seen through, the device including:
  a light source configured to emit source light;
  a light guide configured to emit the source light received from the light source from a predetermined surface;
  an image display portion capable of displaying an image by transmitting the source light emitted by the light guide on the basis of an image signal externally provided for image display and also capable of displaying a background by transmitting ambient light incident from a rear side through to a front side; and
  a transparent medium provided on the image display portion on the rear side.

A second aspect of the present invention provides the display device according to the first aspect of the present invention, wherein the transparent medium is made of glass.

A third aspect of the present invention provides the display device according to the first aspect of the present invention, further including a protective portion provided on a surface of the transparent medium that is located on the rear side.

A fourth aspect of the present invention provides the display device according to the third aspect of the present invention, wherein the protective portion is a hard coating film affixed to the surface of the transparent medium or a hard coating layer formed on the surface.

A fifth aspect of the present invention provides the display device according to the first aspect of the present invention, further including an anti-reflective portion provided on a surface of the transparent medium, either on the rear side or the front side, or both surfaces of the transparent medium.

A sixth aspect of the present invention provides the display device according to the fifth aspect of the present invention, wherein the anti-reflective portion is an anti-reflective film affixed to the surface of the transparent medium or an anti-reflective layer formed on the surface.

A seventh aspect of the present invention provides the display device according to the first aspect of the present invention, further including a reflective polarizing portion provided on a surface of the transparent medium, either on the rear side or the front side, or both surfaces of the transparent medium.

Effect of the Invention

In the first aspect of the present invention, the transparent medium inhibits the surface of the light guide from being scratched or stained, so that no bright spots result from scratched or stained portions emitting light. Thus, the visibility of the image display device can be prevented from being reduced due to such bright spots.

In the second aspect of the present invention, scratch-resistant glass prevents the transparency of the transparent medium from being reduced by abrasion or suchlike. In addition, highly transparent glass enhances the visibility of the image display device.

In the third aspect of the present invention, the protective portion inhibits the surface of the transparent medium from being scratched or stained, so that the transparency of the transparent medium can be prevented from being reduced by abrasion or suchlike.

In the fourth aspect of the present invention, the protective portion can be readily affixed to the transparent medium or can be integrally formed with the transparent medium for enhanced durability.

In the fifth aspect of the present invention, the anti-reflective portion inhibits light from the viewer side from, being reflected by the transparent medium, so that light from the viewer side can be prevented from glaring on the display surface. Thus, the reduction of the visibility of the image display device can be prevented.

In the sixth aspect of the present invention, the protective portion can be readily affixed to the transparent medium or can be integrally formed with the transparent medium for enhanced durability.

In the seventh aspect of the present invention, the reflective polarizing portion approximately halves the amount of light from the light guide that is transmitted through the transparent medium to the outside, thereby reducing unnecessary light to the outside and also preventing the reduction of the visibility of the image display device particularly when an image is viewed from the transparent medium side.

MODES FOR CARRYING OUT THE INVENTION

1. First Embodiment

<1.1 Configuration of the Image Display Device>

Figure 1:
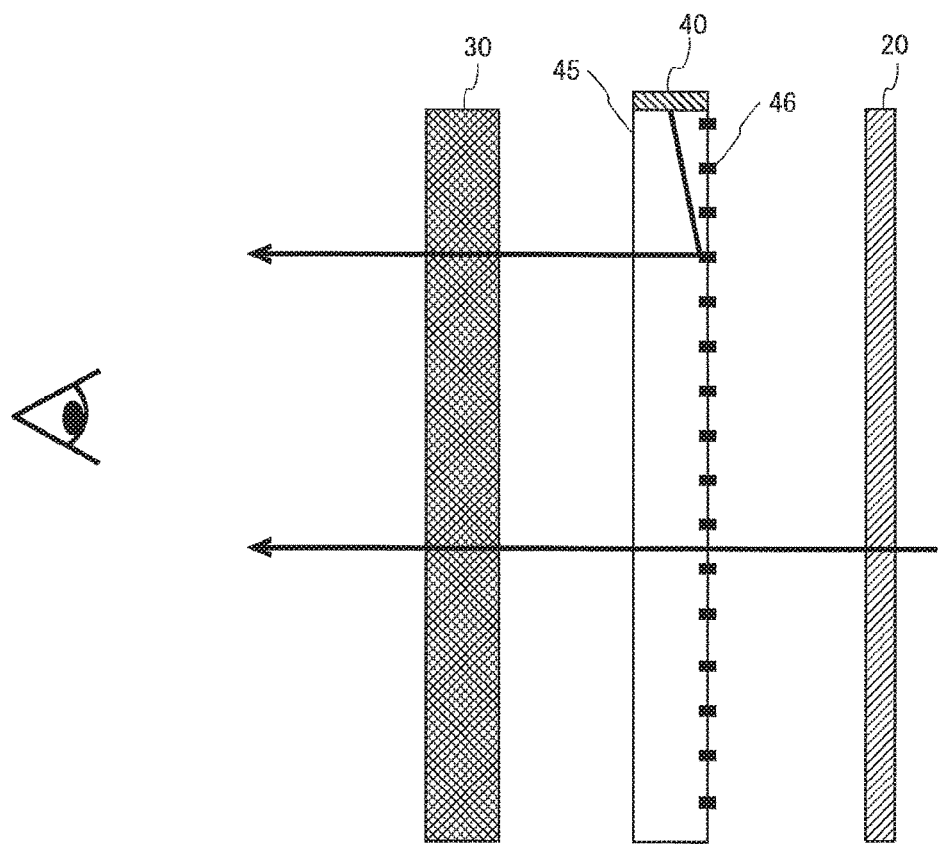
FIG. 1 is a diagram illustrating the configuration of a see-through type display included in an image display device according to a first embodiment of the present invention.

FIG. 1 is a diagram illustrating the configuration of a see-through type display included in an image display device 100 according to a first embodiment of the present invention. In FIG. 1, arrows denote transmission paths of source light emitted by a light guiding plate 45 and ambient light incident from the rear side of the see-through type display of the image display device in the present embodiment.

Furthermore, the image display device includes, from the display surface (front) side to the rear side, a liquid crystal panel 30, the light guiding plate (light guide) 45 with a light source 40 attached thereto, and a transparent plate (transparent medium) 20, which are disposed parallel to one another, as shown in FIG. 1. Note that the light guiding plate 45 and the transparent plate do not have to be planer so long as the light guiding plate 45 is a light guide and the transparent plate is a transparent medium. The structures of the liquid crystal panel 30 and the light guiding plate 45 will be described below, and the transparent plate 20 will be separately described later.

The light guiding plate 45 is, for example, a plate-like body made of a transparent resin such as acrylic or polycarbonate, a plate-like body made of a transparent solid such as glass, or a plate-like container encapsulating a transparent gas such as air. The light guiding plate 45 has the light source 40 attached to an upper edge, and for example, the light source 40 is of an edge-lit type with a plurality of LEDs (light emitting devices) arranged linearly. The light guiding plate 45 has attached to a lower edge a reflective member (not shown) for reflecting light emitted by the light source 40. Accordingly, when source light emitted by the light source 40 is incident on the light guiding plate 45, the source light travels downward or upward inside the light guiding plate 45 while being subjected to total reflection by the front and back of the light guiding plate 45. Note that the reason for using the edge-lit type light source 40 is to facilitate ambient light transmission. Moreover, various known light sources can be applied as light sources 40. In addition, the tight source 40 and the light guiding plate 45 wall also be referred to collectively as the "light source".

The light guiding plate 45 has scatterers 46 for reflecting incident light formed on the surface opposite the liquid crystal panel 30 side. When source light is incident on the scatterers 46, the source light is reflected by the scatterers 46, thereby breaking the state of total reflection. As a result, the source light is directed (almost exclusively) toward the liquid crystal panel 30. In this manner, the light guiding plate 45 used in the present embodiment is an asymmetric light guiding plate, which emits source light from one surface.

Figure 2:
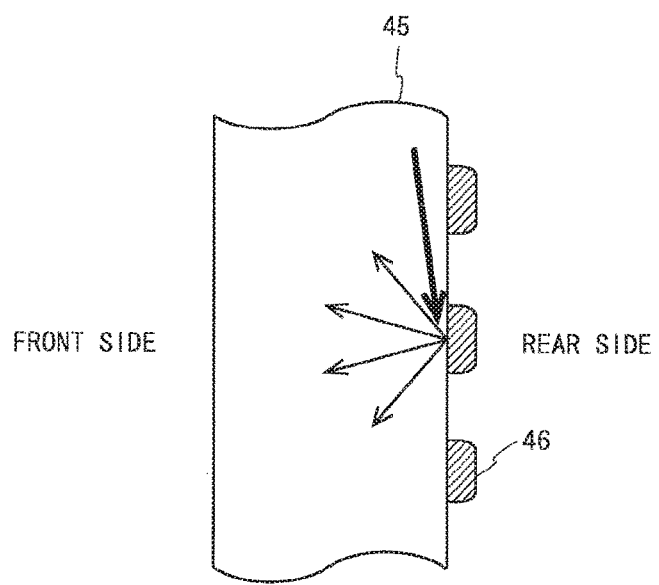
FIG. 2 is a diagram illustrating an example of scatterers formed on a surface of a light guiding plate included in the display of the image display device shown in FIG. 1.

The scatterers 46, which are formed on one surface of the light guiding plate 45 in order to render the light guiding plate 45 an asymmetric light guiding plate, will be described. FIG. 2 is a diagram illustrating an example of the scatterers 46 formed on the surface of the light guiding plate 45. The scatterers 46 are formed by inkjet printing of opaque ink dots about several micrometers in size on the surface of the light guiding plate 45 that is located on the transparent plate 20 side, as shown in FIG. 2. When source light, which travels upward or downward inside the light guiding plate 45 while being subjected to total reflection, is incident on the dots, the source light is spread by the scatterers and emitted toward the liquid crystal panel 30 from the surface opposite the surface with the dots formed thereon. Moreover, the light guiding plate 45 may contain an added diffusing agent such as silica or may have uneven patterns either on the front or back or both. Moreover, any well-known shape for diffusing light, such as a semicircular, lens-like shape, may be employed. Note that the above configuration is merely an example, and various well-known configurations can be employed for the light guiding plate 45.

The liquid crystal panel 30 is simply required to be a panel which, when in OFF state (where no image signal is being written), allows the observer on the front side of the display to view ambient light transmitted from the rear side sequentially through the transparent plate 20 and the light guiding plate 45. Once the liquid crystal panel 30 is brought into ON state (where an image signal is being written), transmittance is further increased in accordance with the image signal, so that backlight, which is illuminating light from the rear side, is transmitted more readily, whereby an image in accordance with the image signal is displayed. The liquid crystal panel 30 as above can be realized by adjusting transmission-axis directions of absorptive polarizing plates affixed to the opposite surfaces. For example, in the case of a TN (twisted nematic) liquid crystal panel in normally black mode, the transmission-axes of the absorptive polarizing plates affixed to the front and the back are directed perpendicular to each other. As a result, the liquid crystal panel 30 becomes transparent even in OFF state by transmitting ambient light incident from the rear side therethrough with predetermined transmittance, and when the liquid crystal panel 30 is brought into ON state, the transmittance is further increased in accordance with a signal voltage, so that the liquid crystal panel 30 displays an image. Note that the absorptive polarizing plates affixed to the opposite surfaces of the liquid crystal panel 30 are not shown in the figure. In addition, the liquid crystal panel 30 will also be referred to below as the "image display portion".

Figure 3:
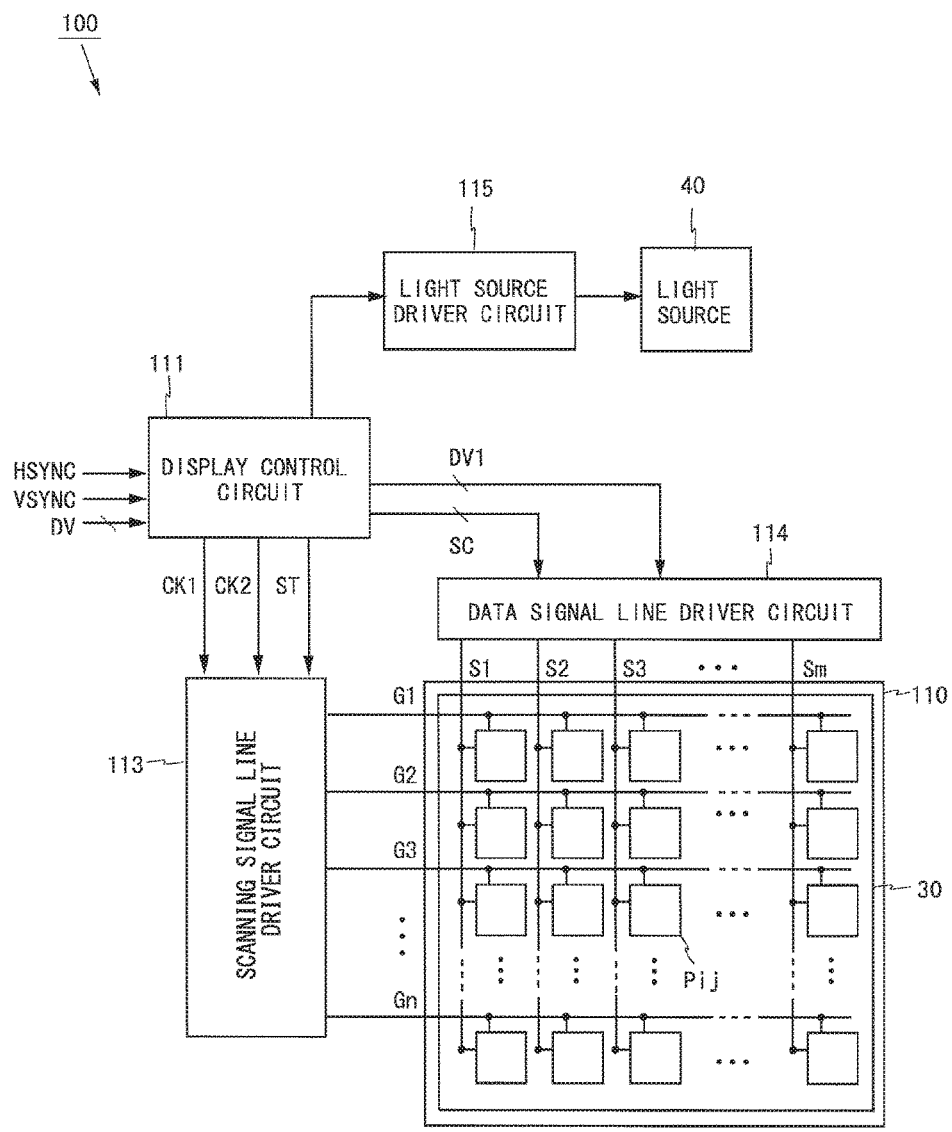
FIG. 3 is a block diagram illustrating the configuration of the image display device including the display shown in FIG. 1.

FIG. 3 is a block diagram illustrating the configuration of the image display device 100 including the display shown in FIG. 1. The image display device 100 is an active-matrix display device including the display 110, a display control circuit 111, a scanning signal line driver circuit 113, a data signal line driver circuit 114, a light source driver circuit 115, and the light source 40, as shown in FIG. 3. Note that the display 110 includes not only the liquid crystal panel 30 but also various other elements, including the polarizing plates and the transparent plate, but such elements are omitted in the figure.

The liquid crystal panel 30 includes in scanning signal lines G1 to Gn, m data signal lines S1 to Sm, and (m×n) pixels Pij (where m is an integer of 2 or more, and j is an integer of from 1 to m). The scanning signal lines G1 to Gn are arranged parallel to one another, and the data signal lines S1 to Sm are arranged parallel to one another so as to be perpendicular to the scanning signal lines G1 to Gn. Disposed in the vicinity of the intersection of the scanning signal line Gi and the data signal line Sj is the pixel Pij. In this manner, the (m×n) pixels Pij are arranged two-dimensionally with m pixels in each row and n pixels in each column. The scanning signal line Gi is connected in common to the pixels Pij in the i'th row, and the data signal line Sj is connected in common to the pixels Pij in the j'th column.

The image display device 100 is externally supplied with control signals, such as a horizontal synchronization signal HSYNC and a vertical synchronization signal VSYNC, and an image signal DV. On the basis of these signals, the display control circuit 111 outputs clock signals CK and a start pulse ST to the scanning signal line driver circuit 113 and a control signal SC and an image signal DV1 to the data signal line driver circuit 114. Moreover, the display control circuit 111 controls the light source driver circuit 115 such that the light source 40 emits source light with a desired intensity.

The scanning signal line driver circuit 113 provides a high-level output signal sequentially to each of the scanning signal lines G1 to Gn. As a result, the scanning signal lines G1 to Gn are sequentially selected one at a time so that all pixels Pij in one row are selected at the same time. On the basis of the control signal SC and the image signal DV1, the data signal line driver circuit 114 provides a signal voltage corresponding to the image signal DV1 to the data signal lines S1 to Sm. As a result, the signal voltage corresponding to the image signal an is written to the pixels Pij in the selected row. In this manner, the image display device 100 displays an image on the liquid crystal panel 30. Note that the display control circuit 111, the scanning signal line driver circuit 113, the data signal line driver circuit 114, and the light source driver circuit 115 will also be referred to collectively as the "drive control portion".

The image display device 100 displays a color image by performing field-sequential drive in which red, green, and blue light (or light in three or more predetermined colors) are sequentially provided in a time-division manner. Such a configuration results in a liquid crystal panel with high transmittance of light from the rear side. As a matter of course, this configuration is illustrative, and a color image may be displayed by forming color filters on the surface of the liquid crystal panel 30. Note that all of these color image display techniques are well-known, and therefore, any detailed descriptions thereof will be omitted.

<1.2 Configuration and Function of the Transparent Plate>

The transparent plate 20 is typically an acrylic plate but may be a transparent resin plate made of material is inexpensive and allows a reduction in device production cost.

Furthermore, the transparent plate 20 is also preferably made of glass. Since glass is highly transparent, the visibility of the image display device 100 increases. Moreover, glass is harder than resin and is resistant to scratches, and therefore, the transparency of the transparent plate 20 can be prevented from being reduced by abrasion or suchlike. Note that such glass is preferably toughened glass, and for example, it is preferable to use air-cooled tempered glass or chemically toughened glass the strength of which is about three to five times and five or more times, respectively, the strength of regular float glass.

Here, the transparent plate 20 is disposed in the vicinity of the surface of the light guiding plate 45 that is opposite the liquid crystal panel 30 side, as shown in FIG. 1, thereby inhibiting the surface of the light guiding plate 45 from being scratched or stained from outside the image display device 100.

<1.3 Effects>

As described above, in the present embodiment, the transparent plate 20 inhibits the surface of the light guiding plate 45 from being scratched or stained, so that no bright spots result from scratched or stained portions emitting light. Thus, the visibility of the image display device 100 can be prevented from being reduced due to such bright spots.

2. Second Embodiment

<2.1 Configuration of the Image Display Device>

Figure 4:
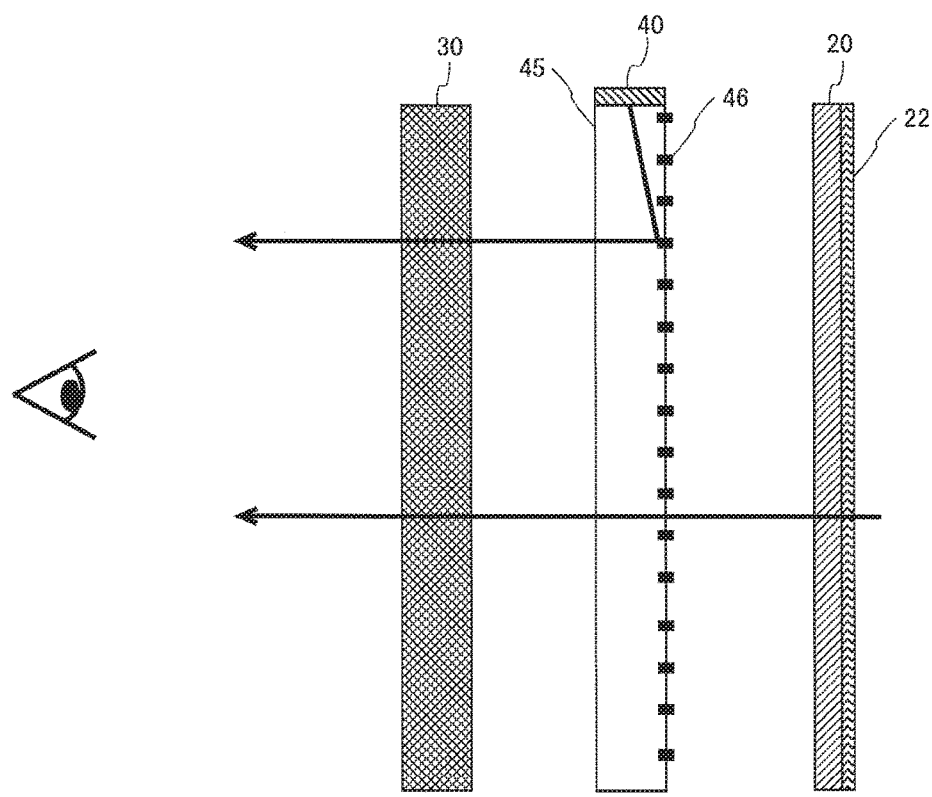
FIG. 4 is a diagram illustrating the configuration of a see-through type display included in an image display device according to a second embodiment of the present invention.

FIG. 4 is a diagram illustrating the configuration of a see-through type display included in an image display device 100 according to a second embodiment of the present invention. As shown in FIG. 4, the image display device 100 according to the present embodiment has the same configuration as the image display device 100 according to the first embodiment, except for an additionally provided protective portion 22, therefore, the same components are denoted by the same reference characters, and any descriptions thereof will be omitted. The protective portion 22 will be described below.

<2.2 Configuration and Function of the Protective Portion>

The protective portion 22 is typically a hard coating film, which is, for example, a resin film on which layers of a thermosetting hard coating material, such as silicon-based, acrylic-based, or melamine-based resin, are fixed. Note that for the hard coating film, various well-known configurations can be employed. By using such a hard coating film, the protective portion 22 can be readily affixed to the transparent plate 20.

Furthermore, the protective portion 22 may be a hard coating layer obtained by a well-known hard coating process. In such a configuration, the protective portion 22 is integrally formed with the transparent plate 20 and therefore can be enhanced in durability.

Here, as shown in FIG. 4, the protective portion 22 is affixed to or formed on the surface of the transparent plate 20 that is opposite the light guiding plate 45 side. The protective portion 22 inhibits the surface of the transparent plate 20 from being scratched or stained from outside the image display device 100. Note that the transparent plate 20 is more effective when made of resin than when made of glass.

<2.3 Effects>

As described above, in the present embodiment, the protective portion 22 inhibits the surface of the transparent plate 20 from being scratched or stained, so that the transparency of the transparent plate 20 can be prevented from being reduced by abrasion or suchlike. Thus, the reduction of the visibility of the image display device 100 can be prevented.

3. Third Embodiment

<3.1 Configuration of the Image Display Device>

Figure 5:
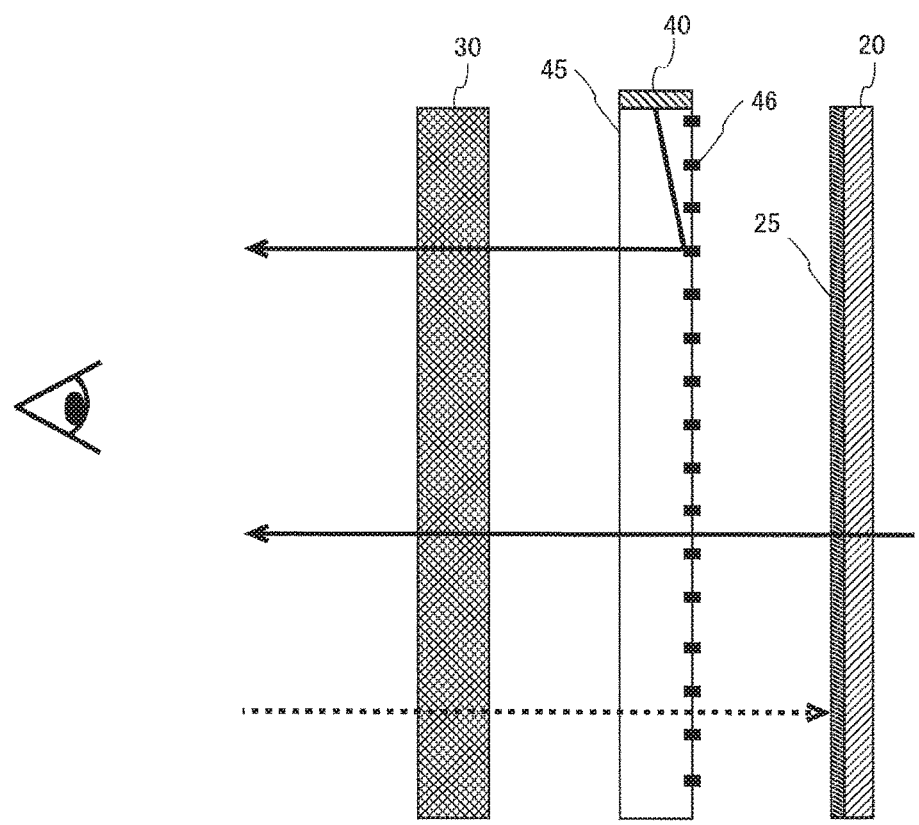
FIG. 5 is a diagram illustrating the configuration of a see-through type display included in an image display device according to a third embodiment of the present invention.

FIG. 5 is a diagram illustrating the configuration of a see-through type display included in an image display device 100 according to a third embodiment of the present invention. As shown in FIG. 5, the image display device 100 according to the present embodiment has the same configuration as the image display device 100 according to the first embodiment, except for an additionally provided anti-reflective portion 25, therefore, the same components are denoted by the same reference characters, and any descriptions thereof will be omitted. The anti-reflective portion 25 will be described below.

<3.2 Configuration and Function of the Anti-Reflective Portion>

The anti-reflective portion 25 is typically an anti-reflective film with a moth-eye structure, and for example, the film has regular arrays of bumps on the hundreds of nanometer scale (i.e., the moth-eye structure) formed on the surface. The arrays of bumps have a refractive index which changes serially in the direction of thickness, and therefore, almost no incident light on the film is reflected (e.g., a reflectance of 0.1% or less). Note that in addition to the anti-reflective film with the moth-eye structure, anti-reflective films with various well-known configurations can also be used. By using the anti-reflective film as above, the anti-reflective portion. 25 can be readily affixed to the transparent plate 20.

Furthermore, for example, the anti-reflective portion 25 may be an anti-reflective layer obtained by providing a moth-eye structure on a surface by thermal transfer or suchlike, or may be a well-known anti-reflective coating (AR coating) layer which is a thin transparent film obtained by vacuum deposition of magnesium fluoride or suchlike. In these configurations, the anti-reflective portion 25 is integrally formed with the transparent plate 20, and therefore, the anti-reflective portion 25 can be enhanced in durability.

Here, as shown in FIG. 5, the anti-reflective portion 25 is affixed to or formed on the surface of the transparent plate 20 that is located on the light guiding plate 45 side. The anti-reflective portion 25 precludes light from the viewer side of the image display device 100 from being reflected by the transparent plate 20 even when the light is transmitted through the liquid crystal panel 30 and the light guiding plate 45 to the transparent plate 20. Note that the anti-reflective portion 25 may be affixed to or formed on the surface of the transparent plate 20 that is opposite the light guiding plate 45 side or may be affixed to or formed on each side of the transparent plate 20.

<3.3 Effects>

As described above, in the present embodiment, the anti-reflective portion 25 inhibits light from the viewer side from being reflected by the transparent plate 20, and therefore, light from the viewer side can be prevented from glaring on the display surface. Thus, the reduction of the visibility of the image display device 100 can be prevented.

4. Fourth Embodiment

<4.1 Configuration of the Image Display Device>

Figure 6:
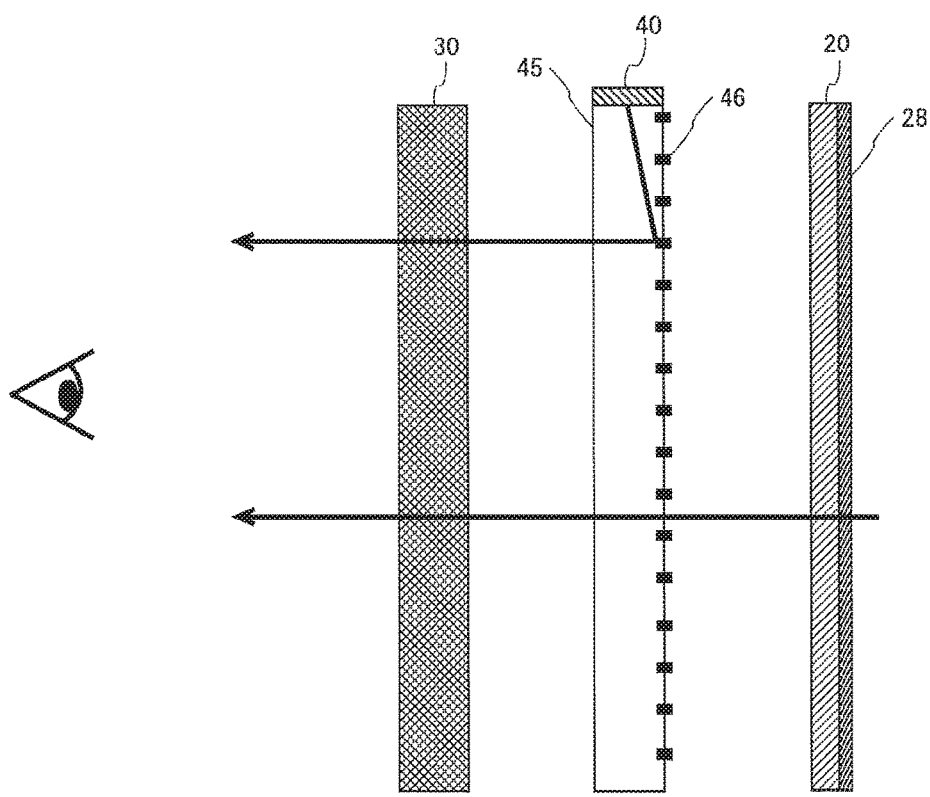
FIG. 6 is a diagram illustrating the configuration of a see-through type display included in an image display device according to a fourth embodiment of the present invention.

FIG. 6 is a diagram illustrating the configuration of a see-through type display included in an image display device 100 according to a fourth embodiment of the present invention. As shown in FIG. 6, the image display device 100 according to the present embodiment has the same configuration as the image display device 100 according to the first embodiment, except for an additionally provided reflective polarizing plate 28, therefore, the same components are denoted by the same reference characters, and any descriptions thereof will be omitted. The reflective polarizing plate 28 will be described below.

<4.2 Configuration and Function of the Reflective Polarizing Plate>

The reflective polarizing plate 28 reflects light components with a predetermined polarization (e.g., S polarization) typically by a structure in which two types of uniaxial thin films are alternatingly stacked or by a wire-grid structure including a fine metal grid. Here, the direction of the reflecting axis of the reflective polarizing plate 28 is aligned with the polarizing axis of the liquid crystal panel 30. In this case, when the reflective polarizing plate 28 is irradiated with source light emitted by the light guiding plate 45, components of the source light with a polarization (e.g., P polarization) different from the predetermined polarization are transmitted through the reflective polarizing plate 28 to the outside, but components with the predetermined polarization are reflected by the reflective polarizing plate 28. Accordingly, the amount of source light that is transmitted to the outside is about half the amount compared to the case where the reflective polarizing plate 28 is not provided.

Furthermore, in the present embodiment, the reflective polarizing plate 28 is provided on the surface of the transparent plate 20 that is opposite the light guiding plate 45 side, but the reflective polarizing plate 28 may be provided on the surface of the transparent plate 20 that is located on the light guiding plate 45 side. Note that the reflective polarizing plate 28 may be a well-known reflective polarizing film affixed to the transparent plate 20 or a well-known reflective polarizer formed on the surface of the transparent plate 20.

<4.3 Effects>

As described above, in the present embodiment, the reflective polarizing plate 28 approximately halves the amount of light from the light guiding plate 45 that is transmitted through the transparent plate 20 to the outside, thereby reducing unnecessary light to the outside and also preventing the reduction of the visibility of the image display device 100 particularly when an image on the liquid crystal panel 30 is viewed from the transparent plate 20 side.

DESCRIPTION OF THE REFERENCE CHARACTERS 20 transparent plate
22 protective portion
25 anti-reflective portion
30 liquid crystal panel
40 light source (edge-lit)
45 light guiding plate
46 scatterer
100 image display device
110 display
111 display control circuit.
113 scanning signal line driver circuit
114 data signal line driver circuit

The invention claimed is:

1. An image display device with a display capable of providing transparent display to allow a background to be seen through, the image display device comprising:
    a light source that emits source light;
    a light guide that emits the source light received from the light source from a predetermined surface;
    an image display portion capable of displaying an image by transmitting the source light emitted by the light guide based on an image signal externally provided to the image display portion and also capable of displaying a background by transmitting ambient light incident from a rear side through to a front side;
    a transparent medium adjacent to a surface of the light guide opposite to the image display portion; and
    a protective portion on a surface of the transparent medium opposite to the light guide, the protective portion being integral with the transparent medium.

2. The image display device according to claim 1, wherein the transparent medium is made of glass.

3. The image display device according to claim 1, wherein the protective portion is a hard coating film affixed to the surface of the transparent medium or a hard coating layer provided on the surface of the transparent medium.

4. An image display device with a display capable of providing transparent display to allow a background to be seen through, the image display device comprising:
    a light source that emits source light;
    a light guide that emits the source light received from the light source from a predetermined surface;
    an image display portion capable of displaying an image by transmitting the source light emitted by the light guide based on an image signal externally provided to the image display portion and also capable of displaying the background by transmitting ambient light incident from a rear side through to a front side;
    a transparent medium adjacent to a surface of the light guide opposite to the image display portion; and
    an anti-reflective portion on a surface of the transparent medium, either on a side adjacent to the light guide or a side opposite to the light guide, or both the side adjacent to the light guide and the side opposite to the light guide, the anti-reflective portion being integral with the transparent medium.

5. The image display device according to claim 4, wherein the anti-reflective portion is an anti-reflective film affixed to the surface of the transparent medium or an anti-reflective layer provided on the surface of the transparent medium.

6. An image display device with a display capable of providing transparent display to allow a background to be seen through, the image display device comprising:
    a light source that emits source light;
    a light guide that emits the source light received from the light source from a predetermined surface;
    an image display portion capable of displaying an image by transmitting the source light emitted by the light guide based on an image signal externally provided to the image display portion and also capable of displaying the background by transmitting ambient light incident from a rear side through to a front side;
    a transparent medium adjacent to a surface of the light guide opposite to the image display portion; and
    a reflective polarizing portion on a surface of the transparent medium, either on a side adjacent to the light guide or a side opposite to the light guide, or both the side adjacent to the light guide and the side opposite to the light guide, the reflective polarizing portion being integral with the transparent medium.

7. The image display device according to claim 4, wherein the transparent medium is made of glass.

8. The image display device according to claim 6, wherein the transparent medium is made of glass.

* * * * *